(No Model.)
O. W. HUDGINS & J. A. JONES.
FRUIT PICKER.
No. 605,461. Patented June 7, 1898.
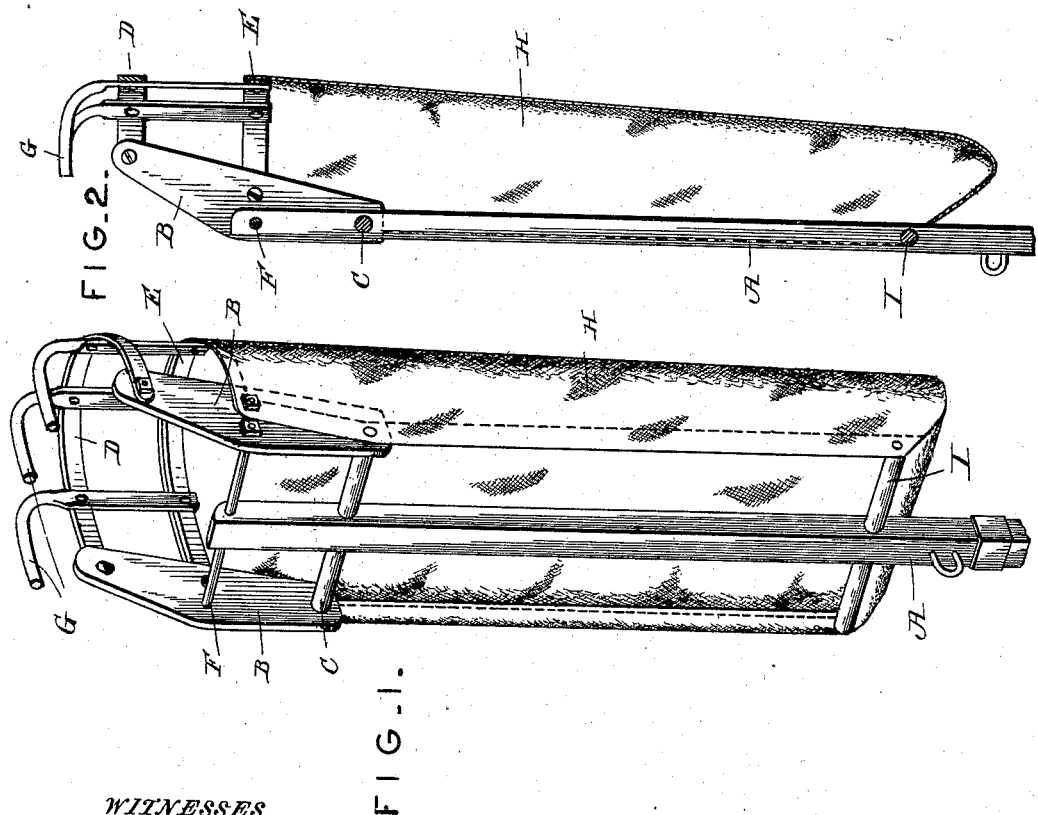
WITNESSES
Harry L. Amer.
J. G. Tabler.
INVENTORS
Oscar W. Hudgins,
James A. Jones,
by John Wedderburn
Attorney

UNITED STATES PATENT OFFICE.

OSCAR W. HUDGINS AND JAMES A. JONES, OF HARRISON, ARKANSAS.

FRUIT-PICKER.

SPECIFICATION forming part of Letters Patent No. 605,461, dated June 7, 1898.

Application filed August 12, 1896. Serial No. 602,487. (No model.)

*To all whom it may concern:*

Be it known that we, OSCAR W. HUDGINS and JAMES A. JONES, citizens of the United States, residing at Harrison, in the county of Boone and State of Arkansas, have invented certain new and useful Improvements in Fruit-Pickers; and we do hereby declare the following to be a full, clear, and exact description of the invention, such as will enable others skilled in the art to which it appertains to make and use the same.

This invention relates to certain new and useful improvements in fruit pickers and gatherers; and it has for its objects, among others, to provide a simple and cheap construction whereby fruit can be readily picked from the tree at any desired height, guarded against injury, and conducted by a sack to the ground or any desired receptacle. We may sometimes employ a standard to aid in the manipulation of the gatherer and to lighten its weight when lengthened, the handle being designed to be made in sections, so that it may be lengthened in accordance with the height of the tree.

Other objects and advantages of the invention will hereinafter appear, and the novel features thereof will be specifically defined in the appended claims.

The invention is clearly illustrated in the accompanying drawings, forming a part of this specification, and in which—

Figure 1 is a perspective view of the improved fruit-picker. Fig. 2 is a section through the same.

Like letters of reference are employed to designate like parts in both views.

Referring now to the details of the drawings by letter, A designates the handle, which may be of any desired length and preferably in sections hinged or otherwise connected so as to be lengthened or shortened, according to the height of the fruit to be gathered.

B are strips arranged at the upper end of the handle. They are supported at their lower ends by the cross-piece C, which passes through the handle, and at their upper ends by the semicircular piece D and between their ends by the semicircular piece E and the rod F, which passes through the said pieces near their centers and through the upper end of the handle.

G are grabbers or prongs secured to the semicircular pieces D and E and having their upper ends curved forwardly. They may be three or more in number, as may be preferred.

H is a sack of canvas or other suitable material secured to the lowermost semicircular piece and to the side pieces and at its lower end supported on a cross-bar I, passed through the handle. This sack may be of through the handle. This sack may be of any desired length, extending entirely to the ground or terminating at any desired distance therefrom.

The operation will be apparent. The fruit is engaged by the prongs or gatherers and loosened from the tree by a pull on the handle or a push upward, and the fruit falls into the sack, by which it is conducted to the ground or any suitable receptacle provided therefor. The side pieces prevent injury to the fruit and prevent the same from falling out when pulled from the tree.

In order to protect the fruit, the parts where the fruit would strike with sufficient force to bruise it are lightly padded with some suitable soft material.

What we claim as new is—

1. In a fruit-picker, the combination with the sectional adjustable handle, of the side pieces at the upper end thereof, the semicircular pieces secured to the side pieces, the horizontal rods connecting the side pieces and having the handle secured thereto and the curved grabbers mounted on the semicircular pieces, substantially as specified.

2. In a fruit-picker, the combination with the sectional adjustable handle, of the side pieces at the upper end thereof, the cross-rods connecting said side pieces and to which the handle is attached, the semicircular pieces secured to the side pieces, and the curved grabbers mounted on the semicircular pieces, and the sack secured at its upper end to the side pieces, substantially as specified.

3. In a fruit-picker, the combination with the sectional adjustable handle, of the side pieces at the upper end thereof, the semicircular pieces secured to the side pieces, and the curved grabbers mounted on the semicircular pieces, the sack secured at its upper end to the side pieces, and the cross-pieces passed through the handle and connecting said side pieces, substantially as specified.

4. The herein-described fruit-picker comprising a handle, transverse rods passed through the handle near the upper end thereof, side strips secured to the ends of said rods, semicircular bands secured to the side strips at their upper ends and near their centers, grabbers arranged at right angles to said semicircular pieces and secured to each thereof and having their free ends curved forwardly, a transverse rod secured to the pole or handle at a distance from the first-mentioned cross-rods, and a sack secured to the lowermost semicircular band and to the side pieces and to the lowermost cross-rod, all substantially as herein shown and described.

In testimony whereof we have signed this specification in the presence of two subscribing witnesses.

OSCAR W. HUDGINS.
JAMES A. JONES.

Witnesses:
S. P. ELZEY,
W. F. MITCHELL.